US009123307B2

(12) United States Patent
Kobayashi et al.

(10) Patent No.: US 9,123,307 B2
(45) Date of Patent: Sep. 1, 2015

(54) DISPLAY SYSTEM, HOST DEVICE, AND DISPLAY DEVICE

(75) Inventors: Fumiyuki Kobayashi, Osaka (JP); Kohji Saitoh, Osaka (JP); Masami Ozaki, Osaka (JP); Taketoshi Nakano, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 14/232,714

(22) PCT Filed: Aug. 7, 2012

(86) PCT No.: PCT/JP2012/070121
§ 371 (c)(1), (2), (4) Date: Jan. 14, 2014

(87) PCT Pub. No.: WO2013/024753
PCT Pub. Date: Feb. 21, 2013

(65) Prior Publication Data
US 2014/0168197 A1 Jun. 19, 2014

(30) Foreign Application Priority Data
Aug. 12, 2011 (JP) ................................ 2011-177225

(51) Int. Cl.

| | |
|---|---|
| ***G06F 3/038*** | (2013.01) |
| ***G09G 5/00*** | (2006.01) |
| ***G09G 3/36*** | (2006.01) |
| ***G09G 3/20*** | (2006.01) |

(52) U.S. Cl.
CPC ............ *G09G 3/3648* (2013.01); *G09G 3/2096* (2013.01); *G09G 3/3666* (2013.01); *G09G 2330/021* (2013.01); *G09G 2330/022* (2013.01); *G09G 2340/0435* (2013.01); *G09G 2370/14* (2013.01)

(58) Field of Classification Search
CPC .............. G09G 3/2096; G09G 3/3666; G09G 2330/021; G09G 2330/022; G09G 2370/14; G09G 3/3648; G09G 2340/0435
See application file for complete search history.

(56) References Cited

U.S. PATENT DOCUMENTS

2007/0176919 A1* 8/2007 Yamashita et al. ............ 345/214
2013/0241859 A1 9/2013 Saitoh et al.

FOREIGN PATENT DOCUMENTS

JP 2007-206232 A 8/2007
WO 2012/067073 A1 5/2012

OTHER PUBLICATIONS

Official Communication issued in International Patent Application No. PCT/JP2012/070121, mailed on Nov. 13, 2012.

*Primary Examiner* — Charles V Hicks
(74) *Attorney, Agent, or Firm* — Keating & Bennett, LLP

(57) ABSTRACT

Provided is a display system (1) capable of further reducing electric power consumption. The display system (1) includes: a host device (2) including transceivers (Tx1, Tx2); a display device (3) including receivers (Rx1, Rx2); a plurality of interfaces (IF1, IF2) for transmitting image data from the transceivers (Tx1, Tx2) to the receivers (Rx1, Rx2); changing means for changing the number of transmission lanes to be used by each of the plurality of interfaces (IF1, IF2); and a display panel (5) provided in the display device (3). Each of the interfaces (IF1, IF2) transmits the image data at an identical transmission rate irrespective of the number of the transmission lanes to be used. The display panel (5) displays an image indicated by the image data, at a frame rate corresponding to the total number of the transmission lanes to be used by the each of the interfaces (IF1, IF2).

11 Claims, 6 Drawing Sheets

DISPLAY SYSTEM, HOST DEVICE, AND DISPLAY DEVICE

TECHNICAL FIELD

The present invention relates to a display system including an interface which transmits image data. Further, the present invention relates to a host device which transmits the image data via the interface. Furthermore, the present invention relates to a display device which displays an image indicated by the image data received via the interface.

BACKGROUND ART

In recent years, display devices have been widely used which are thin, lightweight, and low in electric power consumption, and are typified by liquid crystal display devices. Such display devices are particularly provided to, for example, a mobile phone, a smart phone, and a laptop PC (Personal Computer). Further, electronic paper, which is a thinner display device, is expected to be rapidly developed and widespread in the future. Under such circumstances, a reduction in electric power consumption in various kinds of display devices is a common object at present.

Patent Literature 1 discloses an interface which is low in electric power consumption and which includes an operation switching means for (i) switching a given processing mode of a channel to a low-speed processing mode in a case where an amount of an image signal to be subject to a given process is equal to or less than a given amount and more than 0(zero) and (ii) switching the given processing mode of the channel to a stop mode in a case where the amount of the image signal to be subject to the given process is 0(zero), the given processing mode being a mode in a case where the amount of the image signal to be subjected to the given process is more than the given amount.

CITATION LIST

Patent Literature 1

Japanese Patent Application Publication, Tokukai, No. 2007-206232 A (Publication Date: Aug. 16, 2007)

SUMMARY OF INVENTION

Technical Problem

However, the interface of Patent Literature 1 has a problem that a reduction in electric power consumption is not sufficient. For example, in a case where the channel is in the low-speed processing mode, a transmission amount of data is reduced. However, a steady-state current still constantly flows through the channel. Therefore, it is not possible to sufficiently reduce electric power consumption.

The present invention has been made in view of the above problem. According to an embodiment of the present invention, it is possible to further reduce electric power consumption.

Solution to Problem

In order to attain the object, a display system in accordance with the present invention includes: a plurality of interfaces each including (i) a transceiver provided in the host device (ii) a receiver provided in the display device and (iii) a plurality of transmission lanes via which the transceiver and the receiver are connected to each other and image data is transmitted, the image data being transmitted from the transceiver to the receiver at identical transmission rates irrespective of the number of the plurality of transmission lanes to be used; changing means for changing the number of the plurality of transmission lanes to be used; and a display panel, provided in the display device, for displaying an image indicated by the image data at a frame rate corresponding to the total number of the plurality of transmission lanes to be used by the each of the plurality of interfaces.

According to the display system having the above configuration, it is possible to change the number of the plurality of transmission lanes to be used by each of the plurality of interfaces. Note here that each of the plurality of interfaces transmits the image data at the identical transmission rate irrespective of the number of the plurality of transmission lanes to be used. Further, the display panel displays the image at the frame rate corresponding to the number of the plurality of transmission lanes used. That is, according to the display system, it is possible to dynamically increase or reduce a transmission amount of the image data in accordance with the frame rate at which the image is displayed.

According to the display system, in a case where the number of the plurality of transmission lanes to be used is lower than the maximum number, no electric current flows through an unused transmission lane. In this case, it is possible to reduce electric power consumption, as compared with a case where all of the plurality of transmission lanes are used.

Furthermore, according to the display system, the transmission rate of the image data is constant, irrespective of the frame rate of the image. That is, according to the display system, a process of reducing the transmission rate of some of the plurality of transmission lanes is not carried out so as to transmit image data having less data volume, unlike the conventional technique. Since a steady-state current flows through a transmission lane whose transmission rate is reduced, electric power consumption is not sufficiently reduced. In contrast, according to the display system, none of the plurality of transmission lanes is used in which a reduction in electric power consumption is insufficient.

As described above, according to the display system of the present invention, it is possible to further reduce electric power consumption.

In order to attain the above object, a host device in accordance with the present invention which host device transmits image data to a display device includes: a plurality of transceivers each individually constituting an interface, connected to a plurality of transmission lanes, and transmitting the image data via at least any of the plurality of transmission lanes at an identical transmission rate irrespective of the number of the plurality of transmission lanes to be used; and changing means for changing the number of the plurality of transmission lanes to be used by the each of the plurality of transceivers.

According to the above configuration, in a case where the number of the plurality of transmission lanes to be used is lower than the maximum number, no electric current flows through an unused transmission lane. Therefore, it is possible to reduce electric power consumption.

In order to attain the above object, a display device in accordance with the present invention which display device receives image data from a host device and displays an image indicated by the image data includes: a plurality of receivers each individually constituting an interface, connected to a plurality of transmission lanes, and receiving the image data via at least any of the plurality of transmission lanes at an identical transmission rate irrespective of the number of the plurality of transmission lanes to be used; and a display panel for displaying the image indicated by the image data at a frame rate corresponding to the total number of the plurality of transmission lanes to be used by the each of the plurality of receivers.

According to the above configuration, in a case where the number of the plurality of transmission lanes to be used is lower than the maximum number, no electric current flows through an unused transmission lane. Therefore, it is possible to reduce electric power consumption.

Advantageous Effects of Invention

As described above, the display system of the present invention enables a further reduction in electric power consumption.

Figure 2:
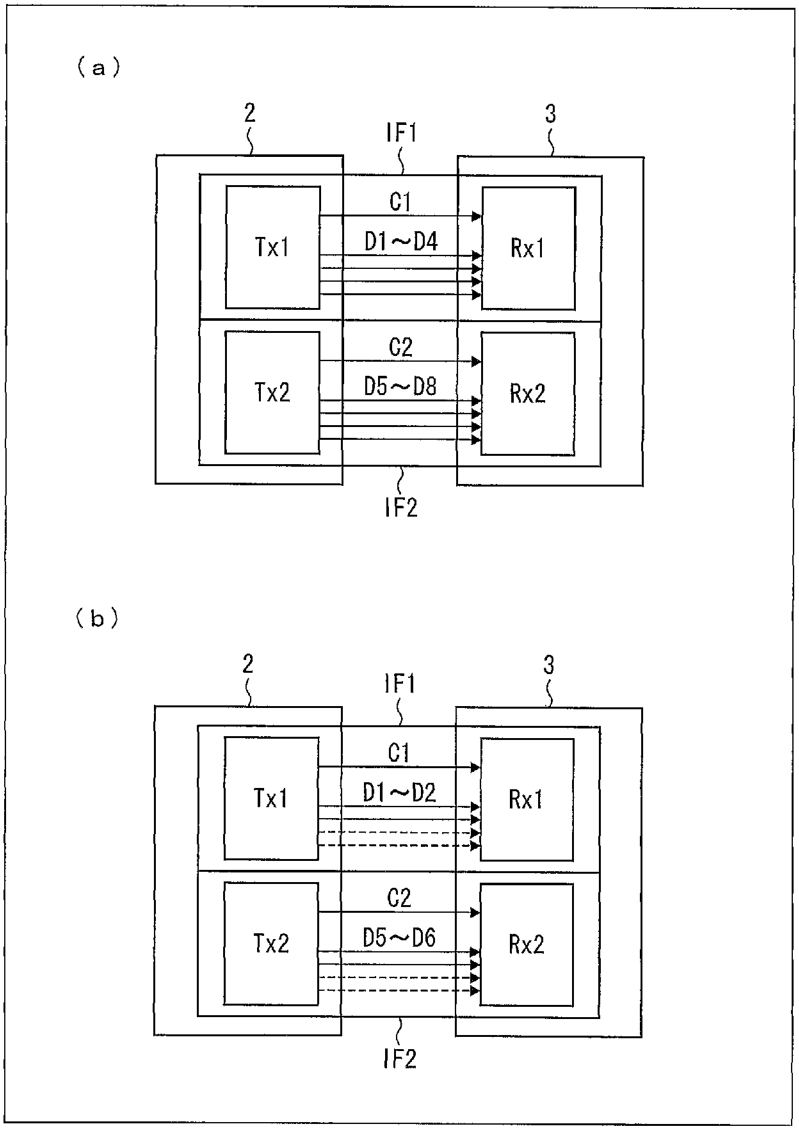

(a) of FIG. 2 is a view illustrating how each of two interfaces transmits image data from a host device to a display device via all of data lanes. (b) of FIG. 2 is a view illustrating how each of the two interfaces transmits image data from the host device to the display device via half of the data lanes.

Figure 3:
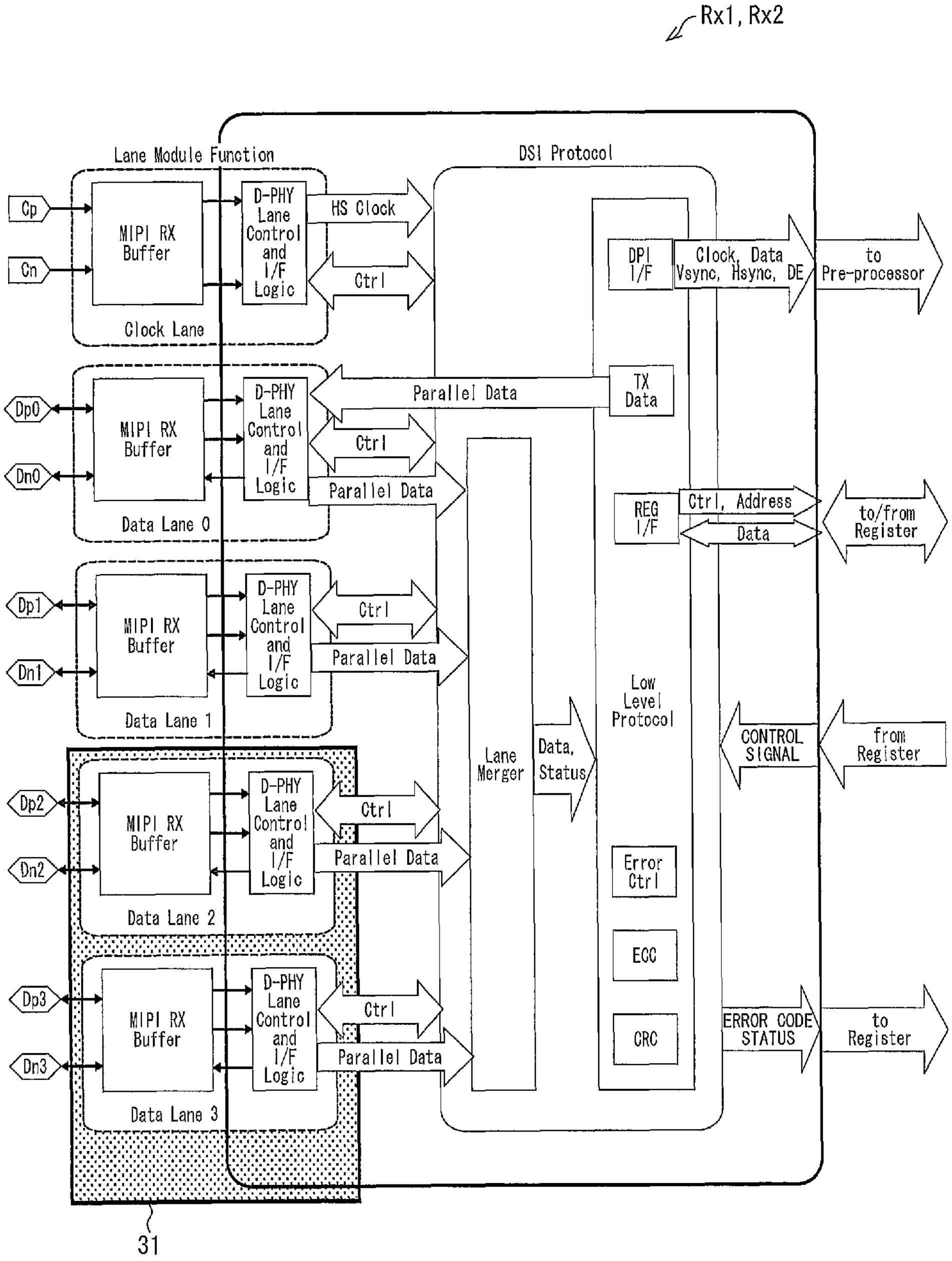

FIG. 3 is a view illustrating circuits whose operations are stopped by each of receivers included in the display system in accordance with the embodiment of the present invention.

Figure 4:
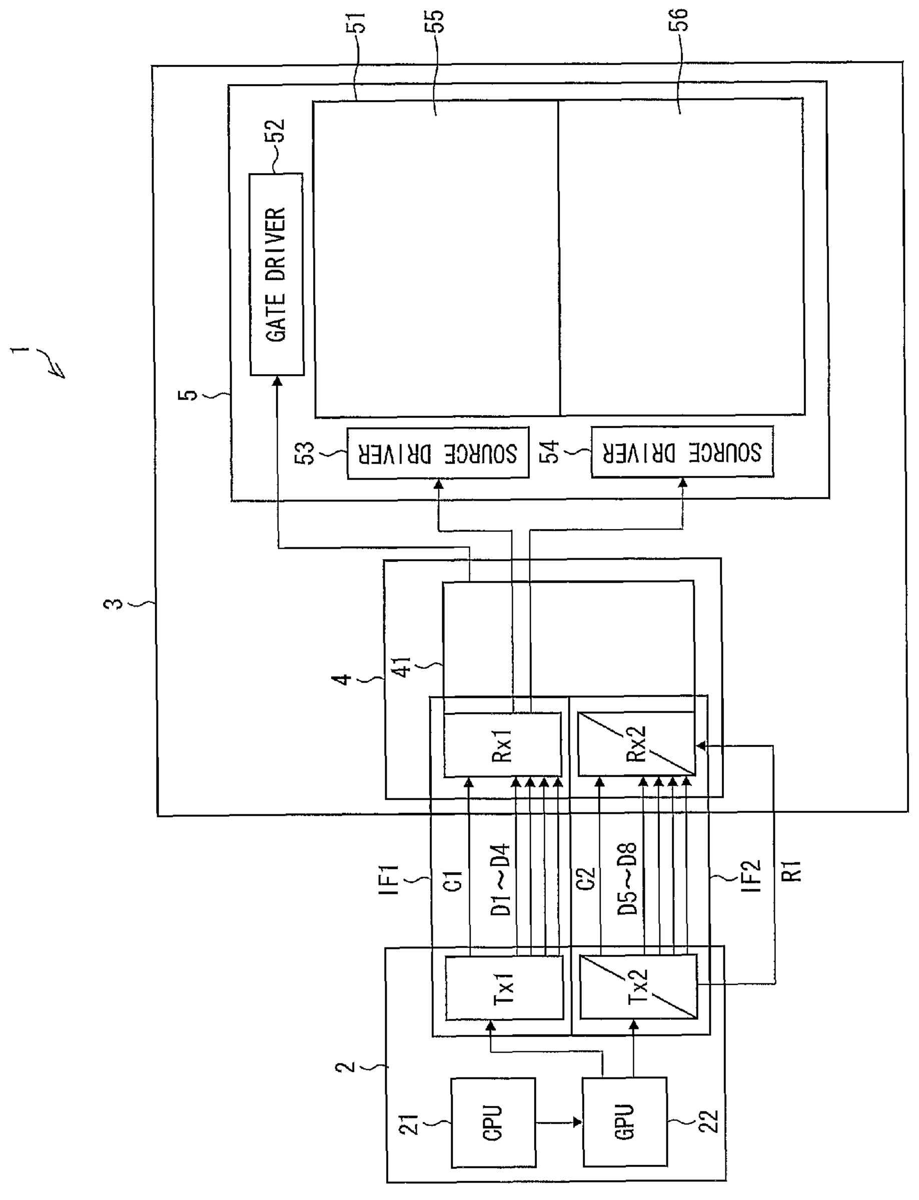

FIG. 4 is a block diagram illustrating a main part of a configuration of a display system in accordance with an embodiment of the present invention.

Figure 5:
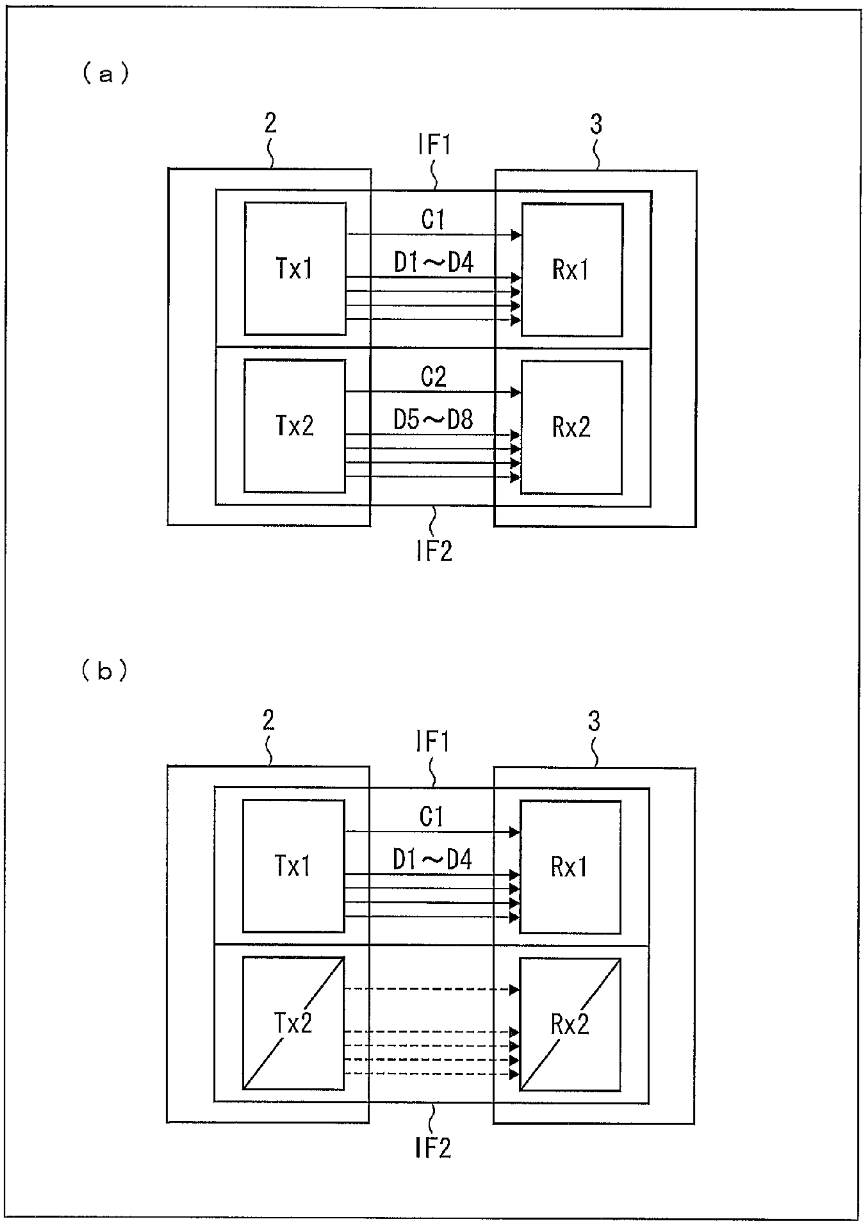

(a) of FIG. 5 is a view illustrating how each of two interfaces transmits image data from a host device to a display device via all of data lanes. (b) of FIG. 5 is a view illustrating how one interface transmits image data from the host device to the display device via all of the data lanes.

Figure 6:
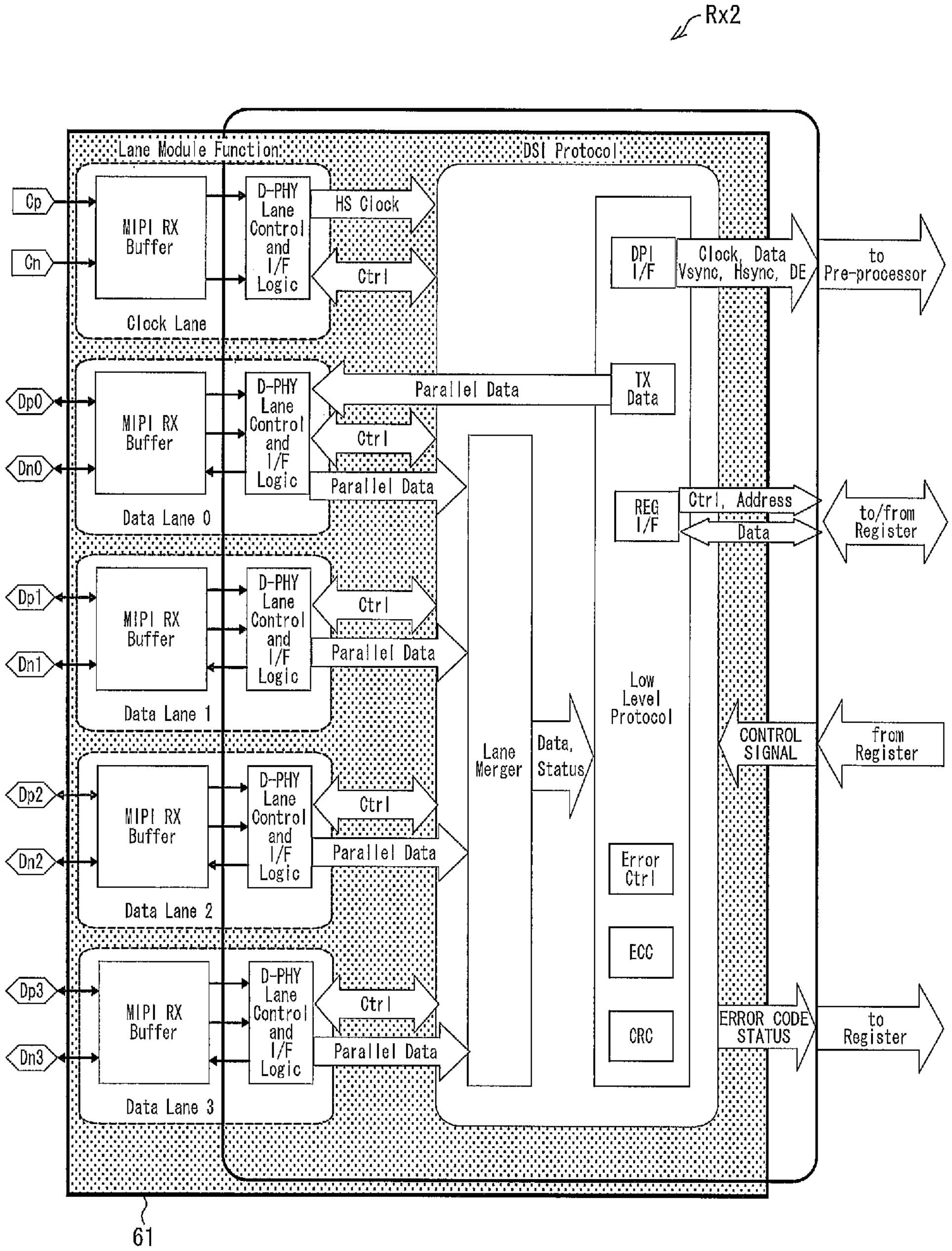

FIG. 6 is a view illustrating circuits whose operations are stopped by one receiver included in the display system in accordance with the embodiment of the present invention.

DESCRIPTION OF EMBODIMENTS

[Embodiment 1]

Figure 1:
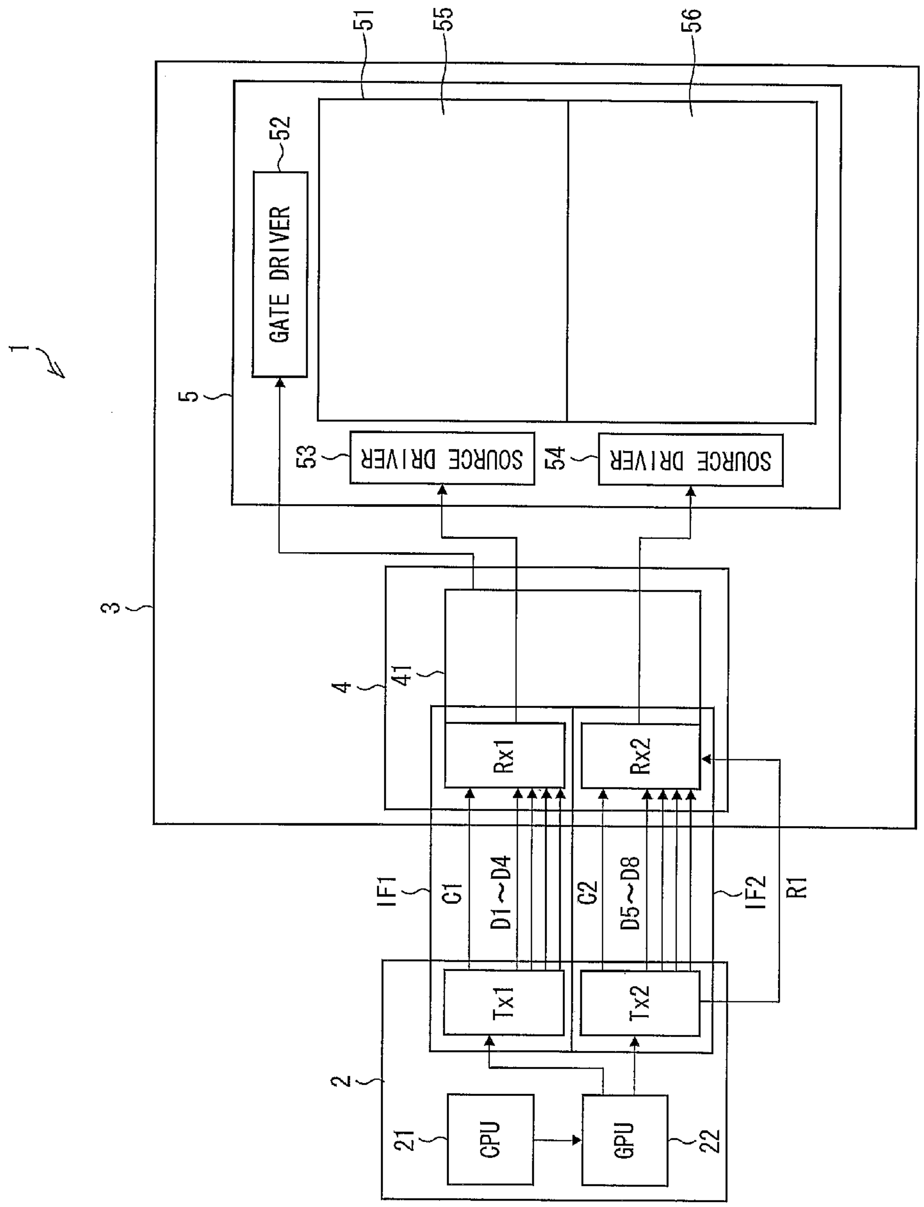
FIG. 1 is a block diagram illustrating a main part of a configuration of a display system in accordance with an embodiment of the present invention.

The following description will discuss Embodiment 1 of the present invention with reference to FIGS. 1 through 3.

FIG. 1 is a block diagram illustrating a main part of a configuration of a display system in accordance with the embodiment of the present invention. As illustrated in FIG. 1, a display system 1 includes a host device 2 and a display device 3. The display system 1 further includes interfaces IF1 and IF2 (changing means) each for transmitting image data from the host device 2 to the display device 3.

(Host Device 2)

The host device 2 includes a CPU 21, a GPU 22, and transceivers Tx1 and Tx2. The transceiver Tx1 constitutes the interface IF1. The transceiver Tx1 is connected to data lanes (transmission lanes) D1 through D4 and to 1 (one) clock lane C1. The transceiver Tx2 constitutes the interface IF2. The transceiver Tx2 is connected to data lanes (transmission lanes) D5 through D8 and to 1 (one) clock lane C2.

(Display Device 3)

The display device 3 includes a control substrate 4 and a display panel 5. The display panel 5 includes a gate driver 52, source drivers 53 and 54, and a display section 51. The display section 51 serves as a liquid crystal display section in which a plurality of pixels and a plurality of TFTs are arranged in a matrix manner. Therefore, the display device 3 is so-called a liquid crystal display device.

A timing controller 41 is provided on the control substrate 4. The timing controller 41 includes receivers Rx1 and Rx2. The receiver Rx1 constitutes the interface IF1. The receiver Rx1 is connected to the data lanes D1 through D4 and to the one clock lane C1. On the other hand, the receiver Rx2 constitutes the interface IF2. The receiver Rx2 is connected to the data lanes D5 through D8 and to the one clock lane C2.

The interface IF1 thus includes the transceiver Tx1, the data lanes D1 through D4, and the receiver Rx1. The interface IF2 thus includes the transceiver Tx2, the data lanes D5 through D8, and the receiver Rx2. It can therefore be said that the display system 1 includes the interfaces IF1 and IF2.

(Flow of Display of Image)

The following description will discuss how an image is displayed in the display system 1.

The host device 2 includes a memory (not illustrated). Image data is stored in such a memory. The CPU 21 reads out the image data from the memory, and then supplies the image data to the GPU 22.

The GPU 22 converts the image data thus received into image data in a form of a differential interface (differential serial signal). Furthermore, the GPU 22 allocates and supplies, to the respective transceivers Tx1 and Tx2, the image data thus converted. Specifically, the GPU 22 supplies, to the transceiver Tx1, image data indicative of a part of an image in each frame which part is displayed on a left-half part 55 of the display section 51. The GPU 22 supplies, to the transceiver Tx2, image data indicative of a part of the image in the each frame which part is displayed on a right-half part 56 of the display section 51.

(Transmission of Image Data)

According to the interface IF1, the transceiver Tx1 transmits the image data to the receiver Rx1 via the data lanes D1 through D4. In this case, the transceiver Tx1 supplies, to the receiver Rx1 via the clock lane C1, a clock signal which varies depending on a transmission rate of the image data. By receiving the clock signal, it is possible for the receiver Rx1 to receive the image data at a constant transmission rate from the transceiver Tx1.

On the other hand, according to the interface IF2, the transceiver Tx2 transmits the image data to the receiver Rx2 via the data lanes D5 through D8. In this case, the transceiver Tx2 supplies, to the receiver Rx2 via the clock lane C2, a clock signal which varies depending on a transmission rate of the image data. By receiving the clock signal, it is possible for the receiver Rx2 to receive the image data at a constant transmission rate from the transceiver Tx2.

(Transmission Rate of Image Data)

According to the interfaces IF1 and IF2, it is possible to arbitrarily change the number of the data lanes used to transmit the image data (later described in detail). For example, the image data can be transmitted via all of the data lanes. Alternatively, the image data can be transmitted via half of the data lanes.

Each of the interfaces IF1 and IF2 always transmits the image data at the constant transmission rate, irrespective of the number of the data lanes to be used. That is, the transmission rate of the image data will never be changed. As such, the image data is stored at a frequency of 60 Hz, in a case where (i) the image data is set to be transmitted at the frequency of 60 Hz and (ii) the image data is transmitted via even two data lanes.

Note that Embodiment 1 discusses a case where the transmission rate of the image data is 806 Mbps per lane. Note, however, that the present invention is not limited to such a transmission rate.

(Receipt of Image Data)

The receivers Rx1 and Rx2 each convert received image data from a differential serial signal to a parallel signal. The timing controller 41 supplies the parallel signal to the source drivers 53 and 54 at a predetermined timing. In this case, the timing controller 41 supplies, to the source driver 53, the image data converted by the receiver Rx1, whereas the timing controller 41 supplies, to a source driver 54, the image data converted by the receiver Rx2. Furthermore, the timing controller 41 supplies a gate signal to the gate driver 52.

The display panel 5 is configured such that the gate driver 52 supplies the gate signal to the display section 51. The source driver 53 supplies, to the left-half part 55 of the display section 51, source signals in accordance with the image data thus supplied. Meanwhile, the source driver 54 supplies, to the right-half part 56 of the display section 51, source signals in accordance with the image data thus supplied. Thus, the image indicated by the image data is displayed on the display section 51 of the display device 3.

The display panel 5 is capable of displaying an image on the display section 51 at a desired frame rate. In other words, the display device 3 is capable of driving the display panel 5 at a desired frame rate. Note here that 60 Hz is best employed as the frame rate. Besides, 30 Hz or 1 Hz can also be employed as the frame rate. The main purpose of lowering the frame rate from 60 Hz to 30 Hz or 1 Hz is to reduce electric power required to drive the display panel 5. According to Embodiment 1, it is further possible to efficiently reduce electric power required for the interfaces IF1 and IF2 (later described in detail).

The following description will specifically discuss how an operation of each of the interfaces IF1 and IF2 is controlled in a case where an image is displayed, at a frame rate of 60 Hz or 30 Hz, in the display system 1. Specifically, the following description will discuss an example in which the frame rate is switched from 60 Hz to 30 Hz while the image is being displayed.

(Frame Rate of 60 Hz)

(a) of FIG. 2 is a view illustrating how each of the interfaces IF1 and IF2 transmits image data from the host device 2 to the display device 3 via all of the data lanes. According to an example illustrated in (a) of FIG. 2, the display panel 5 displays an image on the display section 51 at a frame rate of 60 Hz. Each of the interfaces IF1 and IF2 transmits the image data via all of the data lanes. Specifically, the interface IF1 transmits the image data via the data lanes D1 through D4, and the interface IF2 transmits the image data via the data lanes D5 through D8.

Each of the receivers Rx1 and Rx2 uses four data lanes. From calculations, the timing controller 41 recognizes that the total number of the data lanes, used to transmit the image data, is eight. The timing controller 41 then supplies the image data to the source drivers 53 and 54 at the frame rate of 60 Hz which corresponds to eight data lanes. Accordingly, the display panel 5 displays an image on the display section 51 at the frame rate of 60 Hz.

All of the data lanes D1 through D8 are always used to transmit image data. This causes the display system 1 to consume relatively large amount of electric power.

The interface IF2 can be configured such that a control signal which specifies a frame rate (60 Hz) is transmitted from the transceiver Tx2 to the receiver Rx2 via a control lane. In this case, the timing controller 41 supplies image data to the source drivers 53 and 54 at the frame rate specified by the control signal which the receiver Rx2 has received.

Note that the interface IF2 can be alternatively configured such that a control signal is transmitted via any of the data lanes D5 through D8, instead of the control lane R1. In this case, the control signal is embedded in image data to be transmitted, and then transmitted together with the image data. In this regard, the control signal is preferably embedded in the image data during a blanking period of the image data. This allows the control signal to be transmitted without distorting a transmission form of the image data.

(Frame Rate of 30 Hz)

(b) of FIG. 2 is a view illustrating how each of the interfaces IF1 and IF2 transmits image data from the host device 2 to the display device 3 via half of the data lanes. According to an example illustrated in (b) of FIG. 2, the display panel 5 displays an image on the display section 51 at a frame rate of 30 Hz. In this case, each of the interfaces IF1 and IF2 needs to change the number of the data lanes to be used. Specifically, each of the interfaces IF1 and IF2 changes the number of the data lanes to be used to half of the number of all of the data lanes, that is, to two data lanes. Accordingly, each of the interfaces IF1 and IF2 transmits the image data via the two data lanes. Specifically, the interface IF1 transmits image data via the data lanes D1 and D2, and the interface IF2 transmits image data via the data lanes D5 and D6.

Each of the receivers Rx1 and Rx2 uses two data lanes. From calculations, the timing controller 41 recognizes that the total number of the data lanes, used to transmit the image data, is four. The timing controller 41 then supplies the image data to the source drivers 53 and 54 at the frame rate of 30 Hz which corresponds to four data lanes. Accordingly, the display panel 5 displays an image on the display section 51 at the frame rate of 30 Hz.

According to the example illustrated in (b) of FIG. 2, the display system 1 is configured such that two clock lanes and four data lanes are used. In other words, the display system 1 is configured such that the other four data lanes are not used. No electric current flows through the other four data lanes. It is therefore possible to reduce electric power consumption, as compared with the example illustrated in (a) of FIG. 2 in which all of the data lanes are used.

Note that, according to the display system 1, the transmission rate of image data is constant, irrespective of the frame rate of an image. That is, according to the display system 1, a process of reducing the transmission rate of some of the data lanes is not carried out so as to transmit image data having less data volume, unlike the conventional technique. Since a steady-state current flows through a data lane whose transmission rate is reduced, electric power consumption is not sufficiently reduced. In contrast, according to the display system 1 of Embodiment 1, none of the data lanes is used in which a reduction in electric power consumption is insufficient. Therefore, it is possible to further reduce electric power consumption.

(Control Signal)

The interface IF2 can be configured such that a control signal which specifies a frame rate (30 Hz) is transmitted from the transceiver Tx2 to the receiver Rx2 via the control lane. In this case, the timing controller 41 supplies image data to the source drivers 53 and 54 at the frame rate specified by the control signal which the receiver Rx2 has received.

Note that the interface IF2 can be alternatively configured such that a control signal is transmitted via any of the data lanes D5 through D8, instead of the control lane R1. In this case, the control signal is embedded in image data to be transmitted, and then transmitted together with the image data. In this regard, the control signal is preferably embedded in the image data during a blanking period of the image data. This allows the control signal to be transmitted without distorting a transmission form of the image data.

(Controlling of Number of Data Lanes)

As has been described, each of the interfaces IF1 and IF2 changes, from four to two, the number of the data lanes which the each of the interfaces IF1 and IF2 is to use. Therefore, there is no difference in number of the data lanes to be used between the interfaces IF1 and IF2. That is, each of the interfaces IF1 and IF2 evenly reduces the number of the data lanes which the each of the interfaces IF1 and IF2 is to use. Note here that the number of the data lanes to be used by the interface IF1 is preferably different by one or less from that of the data lanes to be used by the interface IF2. It follows that the number of the data lanes to be used by the interface IF1 is identical or almost identical to that of the data lanes to be used by the interface IF2. Therefore, according to the display system 1, it is possible to collectively control the interfaces IF1 and IF2.

The display system 1 can include three or more interfaces. Therefore, according to the display system 1, it is possible to change the number of the transmission lanes to be used by each of the interfaces so that the number of the transmission lanes to be used by any of the interfaces is different by one or less from that of the transmission lanes to be used by the other of the interfaces.

The number of the interfaces included in the display system 1 is not limited to two as in Embodiment 1. The display system 1 can include three or more interfaces. It can therefore be said that, according to the display system 1, it is possible to change the number of the transmission lanes to be used by each of the interfaces so that the number of the transmission lanes to be used by any of the interfaces is different by one or less from that of the transmission lanes to be used by the other of the interfaces.

(Changing of Number of Data Lanes During Display of Image)

Each of the interfaces IF1 and IF2 preferably changes, during a blanking period of image data, the number of the data lanes which the each of the interfaces IF1 and IF2 is to use. In this case, the number of the data lanes to be used by each of the interfaces IF1 and IF2 is changed while the display panel 5 is not being driven. Therefore, it follows that the display panel 5 changes, during the blanking period, the frame rate at which an image is displayed. As a result, it is possible to change the frame rate without affecting display of the image.

(Allocation of Image Data)

The GPU 22 can supply, to the receiver Rx1, image data indicative of a part of an image in each frame which part is displayed in odd-numbered rows of the display section 51. In this case, the GPU 22 supplies, to the receiver Rx2, image data indicative of a part of the image in the each frame which part is displayed in even-numbered rows of the display section 51.

The transceiver Tx1 transmits the image data for the odd-numbered rows to the receiver Rx1, whereas the transceiver Tx2 transmits the image data for the even-numbered rows to the receiver Rx2. The timing controller 41 converts the image data received by the receiver Rx1 and the image data received by the receiver Rx2 into (a) image data indicative of a part of the image which part is displayed on the left-half part 55 of the display section 51 and (b) image data indicative of a part of the image which part is displayed on the right-half part 56 of the display section 51. The timing controller 41 then supplies, to the source drivers 53 and 54, respectively, (a) the image data indicative of the part of the image which part is displayed on the left-half part 55 of the display section 51 and (b) the image data indicative of the part of the image which part is displayed on the right-half part 56 of the display section 51.

(MIPI-DSI)

The interfaces IF1 and IF2 are each realized as an interface in conformity with MIPI (Mobile Industry Processor Interface)-DSI (Display Serial Interface). MIPI (registered trademark)-DSI is known as one of high-speed differential interfaces. Therefore, according to the display system 1, it is possible to transmit image data at a high speed, by realizing each of the interfaces IF1 and IF2 as an interface in conformity with MIPI-DSI.

(Block Stopped from Operating)

As illustrated in (b) of FIG. 2, in a case where each of the interfaces IF1 and IF2 is arranged such that only two data lanes are used and the other two data lanes are not used, it is possible to further reduce electric power consumption. This will be described below with reference to FIG. 3.

FIG. 3 is a view illustrating circuits whose operations are stopped by each of the receivers Rx1 and Rx2. According to an example illustrated in FIG. 3, each of the receivers Rx1 and Rx2 is in conformity with MIPI-DSI. In a case where each of the receivers Rx1 and Rx2 does not use two data lanes, the each of the receivers Rx1 and Rx2 stops circuits provided in a region 31 illustrated in FIG. 3. Specifically, each of the receivers Rx1 and Rx2 stops buffers (MIPI Rx Buffer) and serial-parallel conversion blocks (D-PHY Lane Control and I/F Logic). In a case where these circuits are stopped, electric power required to operate the circuits is reduced. It is therefore possible to further reduce electric power consumption.

Note that, according to the display system 1, each of the buffers temporarily stores received image data. The serial-parallel conversion block converts the received image data from a differential serial signal to a parallel signal.

SUMMARY

As has been described, the display system 1 of Embodiment 1, which display system 1 includes the host device 2 and the display device 3, includes: a plurality of interfaces each including (i) a transceiver provided in the host device 2 (ii) a receiver provided in the display device 3 and (iii) a plurality of transmission lanes via which the transceiver and the receiver are connected to each other and image data is transmitted, the image data being transmitted from the transceiver to the receiver at identical transmission rates irrespective of the number of the plurality of transmission lanes to be used; changing means for changing the number of the plurality of transmission lanes to be used; and a display panel 5, provided in the display device 3, for displaying an image indicated by the image data at a frame rate corresponding to the total number of the plurality of transmission lanes to be used by the each of the plurality of interfaces.

Further, the host device 2 which transmits image data to the display device 3 includes: a plurality of transceivers each individually constituting an interface, connected to a plurality of transmission lanes, and transmitting the image data via any of the plurality of transmission lanes at an identical transmission rate irrespective of the number of the plurality of transmission lanes to be used; and changing means for changing the number of the plurality of transmission lanes to be used by the each of the plurality of transceivers.

Further, the display device 3 which receives image data from the host device 2 and displays an image indicated by the image data includes: a plurality of receivers each individually constituting an interface, connected to a plurality of transmission lanes, and receiving the image data via any of the plurality of transmission lanes at an identical transmission rate irrespective of the number of the plurality of transmission lanes to be used; and a display panel 5 for displaying the image indicated by the image data at a frame rate corresponding to the total number of the plurality of transmission lanes to be used by the each of the plurality of receivers.

[Embodiment 2]

The following description will discuss Embodiment 2 of the present invention with reference to FIGS. 4 through 6. Note that identical reference numbers are given to respective members common to those described in Embodiment 1, and no detailed description of the members will be provided.

FIG. 4 is a block diagram illustrating a main part of a configuration of a display system 1 in accordance with the embodiment of the present invention. As illustrated in FIG. 4, the configuration of the display system 1 of Embodiment 2 is identical to that of the display system 1 of Embodiment 1. However, the display system 1 of Embodiment 2 is different in operation from the display system 1 of Embodiment 1. That is, according to the display system of Embodiment 2, it is possible to transmit image data by use of only one of interfaces IF1 and IF2.

(Frame Rate of 60 Hz)

(a) of FIG. 5 is a view illustrating how each of the interfaces IF1 and IF2 transmits image data from a host device 2 to a display device 3 via all of data lanes. According to an example illustrated in (a) of FIG. 5, a display panel 5 displays an image on a display section 51 at a frame rate of 60 Hz. In this case, each of the interfaces IF1 and IF2 transmits the image data via all of the data lanes.

Specifically, the interface IF1 transmits the image data via data lanes D1 through D4, and the interface IF2 transmits the image data via data lanes D5 through D8.

Each of receivers Rx1 and Rx2 uses four data lanes. From calculations, a timing controller 41 recognizes that the total number of the data lanes, used to transmit the image data, is eight. The timing controller 41 then supplies the image data to source drivers 53 and 54 at the frame rate of Hz which corresponds to the eight data lanes. Accordingly, the display panel 5 displays an image on the display section 51 at the frame rate of 60 Hz.

All of the data lanes D1 through D8 are always used to transmit image data. This causes the display system 1 to consume relatively large amount of electric power.

Note that information is prepared in advance for the timing controller 41. Such information defines correlation between respective total numbers of the data lanes to be used and respective frame rates.

Such information is prepared, for example, in a form of table. The timing controller 41 determines, with reference to the information, each frame rate for a corresponding one of the total numbers of the data lanes to be used.

(Frame Rate of 30 Hz)

(b) of FIG. 5 is a view illustrating how only the interface IF1 transmits image data from the host device 2 to the display device 3 via all of the data lanes. According to an example illustrated in (b) of FIG. 5, the display panel 5 displays an image on the display section 51 at a frame rate of 30 Hz. In this case, according to the display system 1, each of the interfaces IF1 and IF2 needs to change the number of the data lanes to be used. Specifically, the number of the data lanes to be used by the interface IF1 is kept unchanged from four. On the other hand, the number of the data lanes to be used by the interface IF2 is changed to zero. Accordingly, the interface IF1 transmits the image data via data lanes D1 through D4, whereas the interface IF2 transmits no image data. In other words, operation of the interfaces IF2 stops. Therefore, a clock lane C2 is also not used.

The receiver Rx1 uses four data lanes. On the other hand, the receiver Rx2 uses no data lane. From calculations, the timing controller 41 recognizes that the total number of the data lanes, used to transmit the image data, is four. The timing controller 41 then supplies the image data to the source drivers 53 and 54 at the frame rate of 30 Hz which corresponds to four data lanes. Accordingly, the display panel 5 displays an image on the display section 51 at the frame rate of 30 Hz.

According to the example illustrated in (b) of FIG. 4, the display system 1 is configured such that one clock lane C1 and four data lanes D1 through D4 are used. In other words, the display system 1 is configured such that one clock lane C2 and four data lanes D5 through D8 are not used. No electric current flows through the data lanes D5 through D8. It is therefore possible to further reduce electric power consumption as compared with the example illustrated in (a) of FIG. 4 in which all of the data lanes D1 through D8 are used.

Further, according to the display system 1, no electric current flows through the clock lane C2 which is not used, among two clock lanes C1 and C2. Therefore, it is possible to further reduce electric power consumption, as compared with the example illustrated in (a) of FIG. 4 in which an electric current flows through the clock lanes C1 and C2.

(Block Stopped from Operating)

FIG. 6 is a view illustrating circuits whose operations are stopped by the receiver Rx2. According to an example illustrated in FIG. 6, the receiver Rx2 is in conformity with MIPI-DSI. According to the example illustrated in (b) of FIG. 5, the interface IF2 does not transmit any image data. Therefore, the receiver Rx2 stops all of the circuits provided in a region 61 illustrated in FIG. 6. Specifically, the receiver Rx2 stops buffers (MIPI Rx Buffer), serial-parallel conversion blocks (D-PHY Lane Control and I/F Logic), a data merger block (Lane Merger), and a protocol analysis block (Low Level Protocol). In a case where these circuits are stopped, electric power required to operate the circuits is reduced. It is therefore possible to further reduce electric power consumption.

According to Embodiment 2, operations of the data merger block and the protocol analysis block are stopped, although the operations of the data merger block and the protocol analysis block are not stopped in Embodiment 1. Therefore, it is possible to reduce more electric power consumption than a case described in Embodiment 1.

Note that, according to the display system 1, the data merger block merges, for each of the data lanes, pieces of image data into one set of image data. The protocol analysis block (i) supplies a timing signal to a block provided in a subsequent stage, (ii) controls a register to read/write data, and (iii) checks an error of image data.

Note that the present invention is not limited to the above embodiments. The present invention may be altered by a person skilled in the art within the scope of the claims. That is, an embodiment is newly obtained which is derived from a combination of technical means altered as appropriate within the scope of the claims. The embodiments specifically discussed in the detailed description of the invention serve solely to illustrate the technical details of the present invention, which should not be narrowly interpreted within the limits of such concrete examples, but rather may be applied in many variations within the spirit of the present invention, provided such variations do not exceed the scope of the patent claims set forth below.

(Overview of the Present Invention)

As has been described, a display system in accordance with the present invention includes: a plurality of interfaces each including (i) a transceiver provided in the host device (ii) a receiver provided in the display device and (iii) a plurality of transmission lanes via which the transceiver and the receiver are connected to each other and image data is transmitted, the image data being transmitted from the transceiver to the receiver at identical transmission rates irrespective of the number of the plurality of transmission lanes to be used; changing means for changing the number of the plurality of transmission lanes to be used; and a display panel, provided in the display device, for displaying an image indicated by the image data at a frame rate corresponding to the total number of the plurality of transmission lanes to be used by the each of the plurality of interfaces.

According to the display system having the above configuration, it is possible to change the number of the plurality of transmission lanes to be used by each of the plurality of interfaces. Note here that each of the plurality of interfaces transmits the image data at the identical transmission rate irrespective of the number of the plurality of transmission lanes to be used. Further, the display panel displays the image at the frame rate corresponding to the number of the plurality of transmission lanes to be used. That is, according to the display system, it is possible to dynamically increase or reduce a transmission amount of the image data in accordance with the frame rate at which the image is displayed.

According to the display system, in a case where the number of the plurality of transmission lanes to be used is lower than the maximum number, no electric current flows through an unused transmission lane. In this case, it is possible to reduce electric power consumption, as compared with a case where all of the plurality of transmission lanes are used.

Furthermore, according to the display system, the transmission rate of the image data is constant, irrespective of the frame rate of the image. That is, according to the display system, a process of reducing the transmission rate of some of the plurality of transmission lanes is not carried out so as to transmit image data having less data volume, unlike the conventional technique. Since a steady-state current flows through a transmission lane whose transmission rate is reduced, electric power consumption is not sufficiently reduced. In contrast, according to the display system, none of the plurality of transmission lanes is used in which a reduction in electric power consumption is insufficient.

As described above, according to the display system of the present invention, it is possible to further reduce electric power consumption.

The display system in accordance with an embodiment of the present invention is preferably arranged such that the changing means changes the number of the plurality of transmission lanes to be used by the each of the plurality of interfaces so that the number of the plurality of transmission lanes to be used by any of the plurality of interfaces is different, by one or less, from that of the plurality of transmission lanes to be used by the other of the plurality of interfaces.

According to the above configuration, the number of the plurality of transmission lanes to be used by the any of the plurality of interfaces is identical or almost identical to that of the plurality of transmission lanes to be used by the other of the plurality of interfaces. Therefore, according to the display system, it is possible to collectively control the plurality of interfaces.

Further, the display system in accordance with an embodiment of the present invention is preferably arranged such that the each of the plurality of interfaces stops a circuit, provided in the receiver, which is connected to a transmission lane which is not used to transmit the image data.

According to the above configuration, it is possible to reduce electric power consumption of the receiver connected to the transmission lane which is not used to transmit the image data. It is therefore possible to reduce electric power consumption of the plurality of interfaces.

The display system in accordance with an embodiment of the present invention is preferably arranged such that the circuit includes a buffer and a lane control and I/F logic block.

According to the above configuration, it is possible to reduce electric power consumption of the receiver connected to the transmission lane which is not used to transmit the image data. It is therefore possible to reduce electric power consumption of the plurality of interfaces.

Further, the display system in accordance with an embodiment of the present invention is preferably arranged such that the changing means changes, to zero, the number of the plurality of transmission lanes to be used by any of the plurality of interfaces.

According to the above configuration, the number of the plurality of interfaces which transmit the image data is reduced. It is therefore possible to completely reduce electric power required to operate an interface which does not transmit the image data. For example, operations of a clock lane, the transceiver, and the receiver are stopped. This allows electric power consumption of those members to be reduced.

As described above, according to the display system having such a configuration, it is possible to further reduce electric power consumption, as compared with a case where the image data is transmitted by use of all of the plurality of interfaces.

The display system in accordance with an embodiment of the present invention is preferably arranged such that the any of the plurality of interfaces stops all circuits provided in its receiver.

According to the above configuration, an interface which does not transmit the image data completely stops its receiver. This allows all electric power required to operate the receiver to be reduced. Therefore, according to the display system, it is possible to further reduce electric power consumption, as compared with a case where the image data is transmitted by use of all of the plurality of interfaces.

Further, the display system in accordance with an embodiment of the present invention is preferably arranged such that the all circuits include all buffers, all lane control and I/F logic blocks, a lane merger block, and a low level protocol block.

According to the above configuration, an interface which does not transmit the image data completely stops its receiver. This allows all electric power required to operate the receiver to be reduced. Therefore, according to the display system having such a configuration, it is possible to further reduce electric power consumption, as compared with a case where the image data is transmitted by use of all of the plurality of interfaces.

Further, the display system in accordance with an embodiment of the present invention is preferably arranged such that the changing means changes, during a blanking period of the image data, the number of the transmission lanes to be used by the each of the plurality of interfaces.

According to the above configuration, the number of the plurality of transmission lanes to be used by each of the plurality of interfaces is changed while the display panel is not being driven. Therefore, since the display panel changes, during a blanking period, the frame rate at which the image is displayed, it is possible to change the frame rate without affecting display of the image.

Further, the display system in accordance with an embodiment of the present invention is preferably arranged such that the each of the plurality of interfaces is in conformity with MIPI-DSI.

According to the configuration, it is possible for each of the plurality of interfaces to transmit the image data at a high speed.

As has been described, a host device in accordance with the present invention which host device transmits image data to a display device includes: a plurality of transceivers each individually constituting an interface, connected to a plurality of transmission lanes, and transmitting the image data via at least any of the plurality of transmission lanes at an identical transmission rate irrespective of the number of the plurality of transmission lanes to be used; and changing means for changing the number of the plurality of transmission lanes to be used by the each of the plurality of transceivers.

According to the above configuration, in a case where the number of the plurality of transmission lanes to be used is lower than the maximum number, no electric current flows through an unused transmission lane. Therefore, it is possible to reduce electric power consumption.

As has been described, a display device in accordance with the present invention which display device receives image data from a host device and displays an image indicated by the image data includes: a plurality of receivers each individually constituting an interface, connected to a plurality of transmission lanes, and receiving the image data via at least any of the plurality of transmission lanes at an identical transmission rate irrespective of the number of the plurality of transmission lanes to be used; and a display panel for displaying the image indicated by the image data at a frame rate corresponding to the total number of the plurality of transmission lanes to be used by the each of the plurality of receivers.

According to the above configuration, in a case where the number of the plurality of transmission lanes to be used is lower than the maximum number, no electric current flows through an unused transmission lane. Therefore, it is possible to reduce electric power consumption.

Industrial Applicability

The present invention can be widely used as various types of display systems (electronic apparatuses), such as personal computers, mobile phones, and smart phones, in which image data is transmitted and an image indicated by the image data is then displayed on a display panel. Furthermore, the present invention can be used as host devices or display devices which constitute the display systems.

REFERENCE SIGNS LIST

1 Display system
2 Host device
3 Display device
4 Substrate
5 Display panel
21 CPU
22 GPU
41 Timing controller
IF1, IF2 Interfaces
C1, C2 Clock lanes
D1 to D8 Data lanes
R1 Control lane
Tx1, Tx2 Transceivers
Rx1, Rx2 Receivers

The invention claimed is:

1. A display system which includes a host device and a display device, comprising:

a plurality of interfaces each including (i) a transceiver provided in the host device (ii) a receiver provided in the display device and (iii) a plurality of transmission lanes via which the transceiver and the receiver are connected to each other and image data is transmitted, the image data being transmitted from the transceiver to the receiver at identical transmission rates irrespective of the number of the plurality of transmission lanes to be used;

changing means for changing the number of the plurality of transmission lanes to be used; and a display panel, provided in the display device, for displaying an image indicated by the image data at a frame rate corresponding to the total number of the plurality of transmission lanes to be used by the each of the plurality of interfaces.

2. The display system as set forth in claim 1, wherein the changing means changes the number of the plurality of transmission lanes to be used by the each of the plurality of interfaces so that the number of the plurality of transmission lanes to be used by any of the plurality of interfaces is different, by one or less, from that of the plurality of transmission lanes to be used by the other of the plurality of interfaces.

3. The display system as set forth in claim 1, wherein the each of the plurality of interfaces stops a circuit, provided in the receiver, which is connected to a transmission lane which is not used to transmit the image data.

4. The display system as set forth in claim 3, wherein the circuit includes a buffer and a lane control and I/F logic block.

5. The display system as set forth in claim 1, wherein the changing means changes, to zero, the number of the plurality of transmission lanes to be used by any of the plurality of interfaces.

6. The display system as set forth in claim 5, wherein the any of the plurality of interfaces stops all circuits provided in its receiver.

7. The display system as set forth in claim 6, wherein the all circuits include all buffers, all lane control and I/F logic blocks, a lane merger block, and a low level protocol block.

8. The display system as set forth in claim 1, wherein the changing means changes, during a blanking period of the image data, the number of the transmission lanes to be used by the each of the plurality of interfaces.

9. The display system as set forth in claim 1, wherein the each of the plurality of interfaces is in conformity with MIPI-DSI.

10. A host device which transmits image data to a display device, comprising:

a plurality of transceivers each individually constituting an interface, connected to a plurality of transmission lanes, and transmitting the image data via at least any of the plurality of transmission lanes at an identical transmission rate irrespective of the number of the plurality of transmission lanes to be used; and changing means for changing the number of the plurality of transmission lanes to be used by the each of the plurality of transceivers.

11. A display device which receives image data from a host device and displays an image indicated by the image data, comprising:

a plurality of receivers each individually constituting an interface, connected to a plurality of transmission lanes, and receiving the image data via at least any of the plurality of transmission lanes at an identical transmission rate irrespective of the number of the plurality of transmission lanes to be used; and a display panel for displaying the image indicated by the image data at a frame rate corresponding to the total number of the plurality of transmission lanes to be used by the each of the plurality of receivers.

* * * * *